United States Patent
Jacobs

[11] 3,879,988
[45] Apr. 29, 1975

[54] OPTICAL COMPARATOR FOR MEASURING VIBRATION ON A ROTATING OBJECT

[75] Inventor: Gordon B. Jacobs, Manlius, N.Y.

[73] Assignee: General Electric Company, Syracuse, N.Y.

[22] Filed: Dec. 19, 1973

[21] Appl. No.: 426,235

[52] U.S. Cl. .................................. 73/71.3; 356/32
[51] Int. Cl. ........................................ G01n 21/22
[58] Field of Search ............. 73/71.3, 71.1; 356/24, 356/32, 256, 110, 111

[56] References Cited
UNITED STATES PATENTS
3,482,436  12/1969  Neish et al. .......................... 73/71.3
3,782,176  1/1974  Jacobs ................................. 73/71.3

Primary Examiner—Jerry W. Myracle
Attorney, Agent, or Firm—Richard V. Lang; Carl W. Baker; Frank L. Neuhauser

[57] ABSTRACT

An optical comparator is disclosed for measuring small surface vibrations on a rotating object. The comparator employs coherent optical techniques which produce a shift in the optical frequency of a laser beam as a result of surface motion. The comparator uses an optical heterodyne to convert the frequency terms expressive of vibration into a convenient low frequency electrical format. Unique beam path transforming means are disclosed which cause the beam to impinge with a substantially constant angle of incidence upon the same surface element throughout an observation period. By increasing coherence, the apparatus sensitivity is increased to the point where measurement can be made on nonspecular surfaces.

8 Claims, 9 Drawing Figures $d_i = 2d_o$

OPTICAL COMPARATOR FOR MEASURING VIBRATION ON A ROTATING OBJECT

BACKGROUND OF THE INVENTION

1. Field of the Invention:

The present invention relates to the art of measurement of small vibratory motions. It also relates to the art of optical measurement of motion using coherent light, wherein optical heterodyning is used to convert the motion information to a low frequency format convenient for electrical measurement.

2. Description of the Prior Art:

With the advent of convenient sources of coherent light, it has become possible to employ light wave phenomena in many common measurements. These techniques have been used to measure static distortions and vibrations from large fractions of an inch down to dimensions which are only a very small fractional wavelength of the light employed.

An optical comparator measuring surface vibration on a rotating object has been disclosed in U.S. application Ser. No. 239,680 now U.S. Pat. No. 3,782,176 filed Mar. 30, 1972 on behalf of Gordon B. Jacobs and entittled "Apparatus for Measuring Vibration in a Moving Object". That apparatus, which was adapted for measuring the vibration of a turbine bucket installed upon a rotating turbine wheel, employed a large fan-shaped beam through which the vibrating object could move transversely without loss of precision in the vibration measurement. The apparatus performed the measurement in a direction parallel to turbine axis by making a comparison between an analytical beam which was reflected from the vibrating tip of the turbine bucket and a reference beam which was reflected from the base of the turbine bucket. Both the tip and the base of the turbine bucket required small specular surfaces so as to improved the amount and coherence of the illumination that was reflected back into the comparator. Creating specular surfaces on the turbine bucket, however, was mechanically undesirable and means were sought to obtain sensitive vibration measurements without the need for employing specular surfaces.

The problem of obtaining optical comparator measurements with a non-specular or scattering surface as applied to measuring turbine bucket vibration has been addressed by others in the field. A recent investigation has been reported in two companion papers appearing in the IEEE, Control and Science, Vol. 120, Sept. 9, 1973. The first paper is entitled "Laser Doppler Instrument for Measurement of Vibration of Moving Turbine Blades". The paper was authored by Kulczyk and Davis. The second paper by the same authors was entittled "Signal/Noise Ratio in Laser Doppler Systems". Both papers discussed scattering surfaces and discussed practical limitations on systems using such surfaces. In the second paper it was pointed out that one might be able to use a scattered signal both for the reference beam and for the analytical beam (FIG. 1c), but concluded that system performance is greatly inferior when both beams are scattered. The two articles also discussed the deteriorative effects of Doppler broadening of the single interrogating beam and signal to noise ratio detection problems arising from the enormous constant Doppler shift superimposed on the desired vibratory Doppler signal.

The experience of Kulczyk and Davis confirms the generally recognized need for major improvements, if measurements are to be made in this kind of application with two scattering surfaces.

SUMMARY STATEMENT OF THE INVENTION

It is an object of the present invention to provide an improved optical comparator using coherent light for the measurement of small object vibrations, while the object is rotating with respect to the measuring apparatus.

It is an additional object of the present invention to provide an optical comparator using coherent light for measuring small vibrations on a rotating object wherein the signal to noise ratio is substantially improved.

It is still another object of the invention to provide an improved optical comparator for measuring small vibrations on a rotating object wherein improved optical coherence has been achieved, permitting either one or both of the surfaces used in the measurement process to be non-specular or scattering surfaces.

These and other objects of the invention are achieved in a novel optical comparator for measuring small vibrational motions at the surface of a rotating object. The comparator comprises a source of a beam of collimated coherent illumination, means to divide the beam into a reference and an analytic beam, means to transform the path of said analytic beam in synchronism with said object rotation to cause impingement on said object at a substantially constant angle of incidence throughout a given rotation, means to intercept the analytic beam after reflection from said surface element, and an optical detector upon which said returning reference and analytic beams impinge. The detector is selected to have adequate bandwidth to allow a heterodyne between said beams containing Doppler Frequency terms indicative of said vibration.

The path transformation means causes the beam to rotate in synchronism with the object through a given rotation. In case of a double beam system, both the analytic and reference beams are similarly rotated. The path transforming means comprises a mirror rotating in synchronism with the object, and a lens for adjusting the rotation into equality with the rotation of the object during an observation interval. The foregoing correction, which holds constant the angle of incidence of the beam upon the rotating object, does not correct for some translational slewing as between the locus of the intersecting beam with the surface of the object and the arcuate path which a given surface element pursues. Use of the comatic properties of the lens makes it possible to bring this locus into substantial coincidence with the arcuate path of a given surface element and thus reduces the slewing and increases the coherence of the measurement.

Use of the foregoing teaching improves the signal to noise ratio of the electrical signal containing motion information and permits one to achieve accurate measurement with non-specular surfaces for both the analytic and reference beams.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

DESCRIPTION OF THE PREFERRED EMBODIMENT

Figure 1:
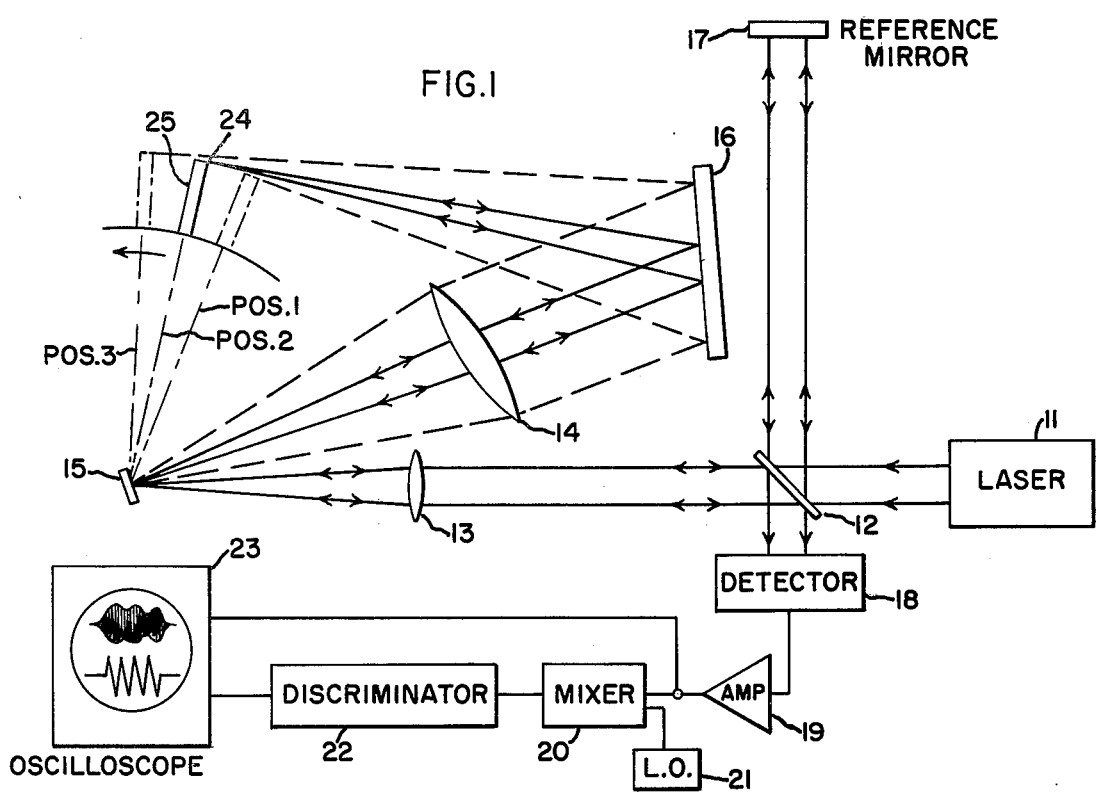
FIG. 1 is an illustration of apparatus for making an optical comparison between a non-specular surface on a moving object and a mirror reference surface and incorporating inventive beam path transformation measures to improve signal coherence.

Referring now to FIG. 1, an optical comparator is shown for observing fine vibrational motion of a turbine bucket blade. The optical comparison is made between a non-specular surface element on the turbine bucket and a reference mirror, the beams by which comparison is made being optically heterodyned in an optical detector. The principal elements of the apparatus comprise the laser 11, a beam splitter 12, first and second lenses 13 and 14 respectively, a mirror 15 mounted for rotation in synchronism with the turbine wheel, an additional stationary mirror 16 in the path of the analytic beam, a mirror 17 in the reference beam path, an optical detector 18, and visual readout equipment coupled to the output of the detector 18 and comprising the elements 19, 20, 21, 22 and 23.

The optical comparator forms an optical heterodyne containing motion information. The laser 11 produces a beam of coherent monochromatic light accurately collimated and having a width of approximately one-eighth inch. The laser beam is directed through a first beam splitter 12 where a "reference" portion of the beam is deflected orthogonally to a reference mirror 17 and an "analytic" portion is transmitted undeflected to the focusing lens 13. The focusing lens 13 focuses the beam upon a mirror 15 attached at the end of the turbine shaft, with the axis of the shaft lying in the plane of the mirror. Thus, the mirror 15 rotates with the turbine wheel and causes the reflection of the laser beam to be scanned in a plane perpendicular to the axis of the shaft. The dimension of the analytic beam as it impinges upon the mirror 15 is small, typically being on the order of two or three thousandths of an inch. The lens 14 images the analytic beam from the rotating mirror 15, after reflection by the first stationary mirror 16, upon a surface element 24 on a turbine bucket 25. Light reflected or "scattered" from the illuminated element on the bucket is then refocused by the lens 14 back upon the rotating mirror 15. After passage through the lens 13, the return beam impinges on the back surface of the beam splitter 12 which deflects a portion of the return beam into the detector 18. As earlier noted, a reference portion of the outgoing laser beam is deflected into a reference mirror 17 and a return reference beam is reflected back to the beam splitter 12 where an undeflected portion impinges on the detector 18. When the analytic beam is returned back upon itself and into coincidence with the return reference beam upon a suitable square law optical detector, an optical heterodyne between the two beams is formed. If the turbine bucket is in vibration at the surface element 24, then as a result of Doppler frequency shifts, the heterodyne will contain electrical terms expressive of this motion. The optical detector 18, upon which the two return beams impinge, has an optical input system (not illustrated) with a relatively small aperture so as to maintain substantial coherence over the input area. The detector is selected to have adequate bandwidth to accommodate any heterodyne terms of interest.

Referring again to FIG. 1, the optical heterodyne formed by the detector 18 takes the form of an electrical signal which is coupled to the amplifier 19 for further amplification. The heterodyne signal is then applied to one input of the dual trace oscilloscope 23. A second output is taken from the amplifier 19 and applied to a mixer 20 to which a local oscillator voltage is applied and the output is then applied to a frequency discriminator 22. The discriminator output is then applied to the second input of the oscilloscope 23.

The basic principles of heterodyne optical comparison are well known. It is known that a heterodyne optical comparator will indicate the frequency and amplitude of vibration of a surface upon which the analytic beam impinges. The underlying phenomenon is the Doppler frequency shift which occurs when waves interact with a moving surface. Assuming a vibration of the surface element 24 which has a substantial component along the direction of the laser beam, a forward change in position of the surface element into the beam, will advance the phase of the return beam and a backward change in position away from the beam will retard the phase of the reflected beam. The total amount of the phase shift depends upon the amount of deflection and the frequency of deflection is equal to the vibration frequency of the turbine blade. The oscilloscope is normally calibrated by use of a Bessel function plot of the first kind to indicate directly the magnitudes of the deflection. FIG. 1 illustrates an artist's rendering of the appearance produced on the oscilloscope at the two inputs by sinusoidal turbine bucket vibration.

Further information into the operation and calibration of a heterodyne optical comparator used for turbine bucket vibration measurement is contained in the previously cited U.S. application Ser. No. 239,680. The elements of the optical comparator described above, which are of particular novelty interest, are those beam path translation measures which increase the phase coherence of the system. These measures include the rotating mirror 15, the lens 14, and the satisfaction of certain critical positional requirements. These path translation measures aid in guiding the analytic beam in such a manner that it dwells on a given surface element of the turbine bucket (without slewing) throughout a substantial arcuate displacement of the bucket and furthermore to cause it to impinge with a constant angle of incidence. When these conditions occur, signal coherence is substantially improved, bringing about a very substantial increase in the signal to noise ratio of the vibration measurement. One practical effect of this improvement is to permit highly accurate motion measurements to be taken on non-specular surfaces.

The manner in which the path of the laser beam is transformed to follow a surface element on the turbine bucket as the turbine wheel rotates is illustrated in the optical schematic of FIG. 2. FIG. 2 illustrates the operation of the first embodiment in a partially corrected state. As will be explained, a correction has been introduced to make the beam impinge on the turbine bucket with a constant angle of incidence, but the beam impingement point or locus has not been completely corrected. For purposes of clarity, the scale of this and several other features of the drawing has been exaggerated. The rotating mirror 15 is shown at the righthand extremity of the picture. The lens 14 is shown to the left of the rotating mirror and three rays 30, 31 and 32 are shown impinging respectively on the lower margin of the lens, the center of the lens, and the upper margin of the lens. After passage through the lens 14, the rays 30, 31, 32 then impinge on the outer extremity of the turbine bucket at the left side of the drawing at three spaced positions. These positions correspond to the limits and mid-point of the observation "window".

Figure 2A:
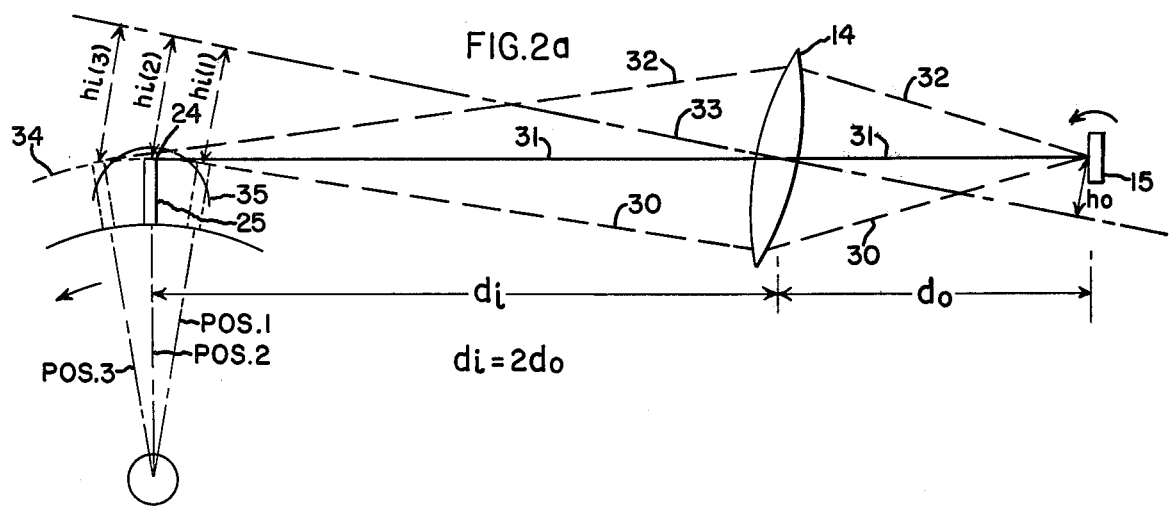
FIG. 2a is an explanatory optical schematic of the embodiment illustrated in FIG. 1, and FIGS. 2a and 2b are auxiliary views illustrating beam intersection logic and the adjustment process for bringing it into coincidence with the path of a selected moving surface element.

The apparatus is arranged with the center of the focused laser beam (on the rotating mirror 15), the center of the lens 14, and a point of tangency on the arcuate path 34 (corresponding to bucket position 2) in a line coincident with ray trace 31. Since the turbine bucket is rotating on the turbine wheel, the path of a selected surface element of the bucket is a circular arc having a constant radius equal to its distance to the hub of the turbine wheel. The path of surface element 24 is shown by the dotted trace 34. Optimally, the lowermost ray should impinge on the surface element (24) of the turbine bucket at the position 1; the ray 31 should impinge on the same surface element 24 with the bucket in position 2; and the ray 32 should impinge on the same surface element 24 with the bucket in position 3. Ideally, each intermediate position of the locus of these intersections should impinge on the same surface element and it should be an arc like 34. In practice, however, without curvature correction, the intersections of the rays 30, 31 and 32 with the bucket are displaced differing amounts from the desired positions on the same surface element. A locus of such intersections is shown by the solid line 35. As illustrated in FIG. 2a (with some exaggeration), the locus 35 has a radius which is smaller than the path of a selected element. This locus is observable as an illuminated curved path.

Small displacements of the beam from the surface element as discussed above, does not prevent coherent operation of the comparator, but rather causes a gradual degradation in sensitivity. Of usually greater importance in maintaining coherence is the requirement that the beam impinge on the bucket at a constant angle of incidence.

The first embodiment has means which cause the laser rays to continuously impinge on the surface element 34 with a substantially constant angle of incidence as the surface element rotates through positions 1, 2 and 3. That function, which will be described initially, is performed in the following manner. Assuming that the turbine wheel is rotating through the angle $\Delta\theta$ between positions 1 and 3, the mirror attached to the turbine shaft will also rotate through an angle $\Delta\theta$ between the two positions. The incremental angular deflection of a beam impinging on a mirror surface, however, is twice any rotational increment of the mirror. Assuming that the mirror rotates through an angle $\Delta\theta$, the included angle between the ray traces 30, 32 on the object side of the lens is $2\Delta\theta$. To insure that the reflected beams 30, 31, 32 impinge on the turbine buckets at the positions 1, 2 and 3 on the image side of the lens with the same angular increments, the lens 14 should scale down the incremental input angle ($2\Delta\theta$) by a factor of 2. To achieve this reduction, the lens 14 is disposed between the rotating mirror 15 and the average position of the turbine bucket, such that the output rays in the image plane have one-half the subtended angle of the rays from the input object. This condition is approximated for small angles when the mirror is at three halves the focal distance from the lens and the average output image is at three times the focal distance from the lens. When this positional requirement is satisfied, each ray 30, 31 and 32 arrives at the turbine bucket at positions 1, 2 and 3, respectively, at a constant angle of incidence.

In the foregoing arrangement, the lens 14 is a 15 inch focal length lens with the rotating mirror spaced 22½ inches away ($d_o$) and the turbine bucket wheels having an average spacing ($d_i$) of 45 inches. The blades operate on a turbine wheel whose diamter is 18 inches.

The foregoing beam path translation, wherein the beam is caused to rotate in synchronism with the angular rotation of the surface element so as to fix the angle of incidence greatly improves the angular coherence of the comparator. This improvement in coherence is observable in several ways including direct viewing. Visually, the reflected energy pattern appears to sweep substantially less as it is returned to the entrance aperture of the optical detector. When the oscilloscope ray traces are examined, there is substantially less background noise; fewer losses of coherence occur per observation period; and there is a substantial increase in signal to noise ratio. In the previously cited literature reference, this same limitation in time of coherence is termed "spectral line width" or "line broadening". Any improvement in coherence permits improvement in deflection sensitivity, measurement at higher turbine speeds at the same sensitivity, and an overall improvement in operation of the apparatus.

The apparatus of FIG. 1 will provide further improvement in coherence if further beam path translation is made. As earlier noted, each surface element on a bucket pursues an arc 34 as the turbine wheel rotates. However, as also earlier noted, the locus 35 of points of impingement on the turbine bucket is also an arc, not necessarily coincident with the arc 34. Further improvement in coherence will occur when the locus 35 is made to be more nearly congruent with the path of the selected bucket element. Referring again to FIG. 2a, the solid line 35 might have been tilted in respect to 34 prior to adjustment but was not so illustrated. It is generally arcuate and has been observed and calculated (assuming perfection in stabilizing the angle of-beam incidence upon the surface element) to have one-half the radius of the turbine bucket path 34. In accordance with a second aspect of the invention, a second, two step correction has been introduced for achieving optimum congruence between the locus 35 and the bucket path 34.

Figure 2B:
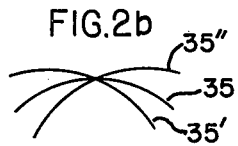
Figure 2C:
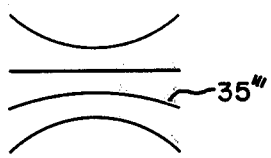

The latter beam path translation effects are best illustrated with reference to FIGS. 2a, 2b and 2c. The translation employs the two steps of producing rotational alignment of the locus (tilt) 35 with the path 34 and then equalizing the radius of curvature of the locus to that of the path 34.

The rotational alignment may be made initially. FIG. 2a illustrates the trace of the laser beam 35 in an optimum, rotationally correct position, leaving any differences in radius from the bucket path uncorrected. In the rotationally correct position, the two traces have the same average slope. When the equipment is initially adjusted, the ray trace 35 (which may or may not be pursuing an arc of one half the turbine wheel radius) may be tilted, i.e., rotated with respect to the arcuate path 34 as shown in FIG. 2b at 35' or 35''. If the lens 14 is translated along ray 31 about the position optimized for incidence angle equalization then the arc of the laser beam will rotate either clockwise or counterclockwise. This adjustment permits one to remove the "tilt" of the locus 35 in respect to the arcuate path 34. Translational lens adjustment allows appreciable freedom in positioning the principal beam in relation to the perimeter of the turbine wheel. The beam may not only impinge at right angles to the radius of the wheel, as illustrated, but intersect at more acute angles. The latter position is often more convenient in getting a more prolonged observation window for a given blade before interference occurs with the next blade.

After the slopes of the two paths have been equalized by lateral adjustment of the position of lens 14, the radii of curvature of the paths 34 and 35 are equalized. This equalization is provided by rotating the lens 14 about an axis perpendicular to the plane of the drawing. In FIG. 2a, the axis of the lens is shown at 33. It is displaced several degrees from the line of the ray 31. The actual angles are normally smaller than illustrated. When the lens is rotated, the curvature of the locus 35 may be adjusted from a concave downward condition to one in which the locus is flattened to approximate the desired arc 34, to one in which it is nearly flat, to one in which it is concave upward. These several conditions are shown in FIG. 2c.

The radius correction of the locus is primarily a result of uncorrected coma in the lens. Coma is a difference in optical power between the central and outer zones of a lens. Let us assume that an input beam impinges successively upon the outer zone of the lower perimeter of the lens (ray 30); next, upon the central zone (ray 31); and, finally, again upon the outer zone at the upper perimeter of the lens (ray 32). Lenses having negative coma will produce greater magnification to the rays passing through the central zone than to those passing through an outer zone. When present, the comatic effect is normally proportional to the height of the object above the lens axis and to the square of the radial distance to the center of the lens of the zone through which a ray passes. As noted, the desired amount of comatic beam correction is achieved by rotation of the lens 14 (angle θ) in respect to the central ray 31. As the lens is rotated, the laser beam focused on the rotating mirror 15 will have an increasing apparent height ($h_o$) above the lens axis 33. Increasing the object height, provides a first order increase in the comatic effect upon the output image. The act of scanning the input beam from the lower perimeter to the upper perimeter of the lens produces a comatic error proportional to the square of the instantaneous radius of the zonal region that is being used. Since only tiny portions of the lens are being used at any moment, the comatic effect does not substantially effect the diffraction diameter of the interrogating laser beam. Further, it can be shown that the length of coherent tracking is improved, insofar as the angle contribution to noise is concerned, by the factor of scanned lens diameter to beam diameter on the lens. This is a factor of about 50 in the present embodiment. The improvement due to the translational correction is equal to the translational slew distance expressed in focal point diameter. This is a factor of about 5 in the present embodiment.

Referring to FIG. 2a, one may qualitatively determine the amount and kind of comatic correction required to force the radius of the locus 35 into equality with the radius of the path 34. The image height of the laser beam required to follow the path of a bucket surface element should vary from $hi_1$ for the bucket in position 1; to $hi_2$ for the bucket in position 2; and finally to $hi_3$ for the bucket in position 3. In the figure, the image height is least at the mid-position 2 and is greatest at end positions 1 and 3. In the process of sweeping the beam to equalize the angle of incidence, the uncorrected path 34 has greater curvature than desired. The curvature resembles positive coma. Therefore, one must introduce negative coma by way of the lens 14, to decrease the magnification for outer rays (at end positions 1 and 3). When this is done, the curvature of the locus (35) followed by the laser beam is also reduced. When the optimum amount of negative coma is introduced, the curvature of locus 35 becomes very close to the curvature of the path 34 pursued by a surface element upon the turbine bucket. Trace 35''' of FIG. 2c represents the ideal and has the same curvature as the path 34 followed by the bucket element.

Figure 4A:
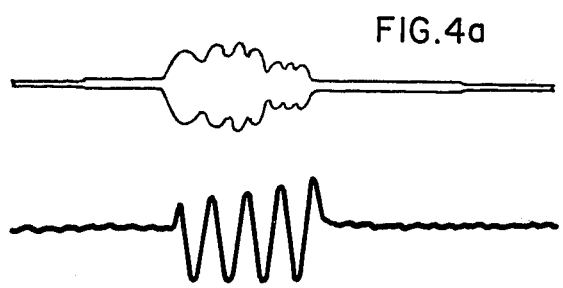
FIGS. 4a and 4b are artist's reproductions of oscillographic recoreds illustrating the improvement in coherence provided by the beam path transformation in the embodiment of FIGS. 1 and 2.
Figure 4B:
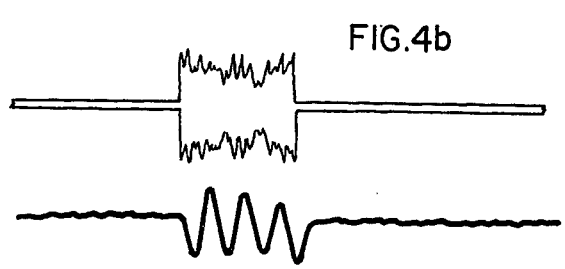

The observed improvement in performance of the first embodiment is illustrated in the oscilloscopic traces of FIGS. 4a and 4b which are manual reproductions of photographs. FIG. 4a represents the dual oscilloscopic traces formed when the beam path corrections have been instituted in the manner above described, while in FIG. 4b the same readings have been taken without the beam path correction features in operation. The readings have been taken of non-specular surfaces with a comparatively large vibration amplitude of two 10 thousandths of an inch at a vibration frequency of 3 kilohertz. Because of the relatively large amplitude of the vibration and low wheel speed (2000 rpm), the improvement in signal to noise ratio of the detected vibration in the example is not observable in the oscilloscope as between the corrected and uncorrected beams. The upper trace of the oscilloscope, however, illustrates the large improvement in performance which has been achieved. In the upper high frequency trace of FIG. 4a, the intermediate frequency carrier, which is at 50 MHz loses coherence approximately 5 times in the observation window when the beam path transformation measures are employed. When the beam path transformation measures are eliminated under the same conditions, the apparent loss in coherence occurs 10 times as often, i.e., approximately 50 times. When the wheel speed is greater and/or the vibration amplitude is smaller, and approaches the limits imposed by shannons theorem or the uncertainty principle, the improvement in usable sensitivity is very substantial.

In practical effect, the beam path translation makes it possible with a small increase in laser power, to gather an adequate laser reflection from a non-specular vibrating surface to provide measurements comparable to those obtained from specular surfaces under the same conditions of observation.

The radius adjustment described above requires that the lens 14 have coma. High quality diffraction limited lenses such as the two element achromatic lenses used for telescope objectives, normally have a suitable amount of uncompensated coma and are readily available for this application.

While the correction sequence has been indicated as axial displacement of the lens 14 followed by its rotation through an angle, the sequence of adjustment may be more complicated, being iterated back and forth so as to produce a best average correction of the slope and radius errors. Depending upon the system configuration, coherence is normally maintainable by these measures over a distance of bucket travel ranging from one half an inch to a few inches.

The first embodiment illustrated in FIGS. 1 and 2 performs a coherent optical comparison between a stationary reference mirror and the laser beam reflected from the non-specular tip of a turbine bucket situated upon a turbine wheel. This results in an extremely high Doppler shift that is difficult to detect with high sensitivity detectors, such as the photomultiplier tube. Further, there are often substantial irregularities in the motion of the turbine wheel as a whole. When these occur, it is desirable that the motion of the turbine bucket be isolated from that of the wheel. Isolation may be achieved by using the base of the turbine bucket as a point of comparison rather than a stationary reference element. A comparator using the preferred technique was described in the above referenced Jacobs application. In that arrangement, specular surfaces were created at the upper limit of the turbine bucket and upon its base, and a very large signal could be reflected back into the detector.

The measures taught in connection with FIGS. 1 and 2 provide the requisite sensitivity to perform coherent vibration measurement using non-specular surfaces for both the reference and analytical portions of the laser beam in many applications. Such an arrangement is illustrated in FIGS. 3a and 3b.

Figure 3A:
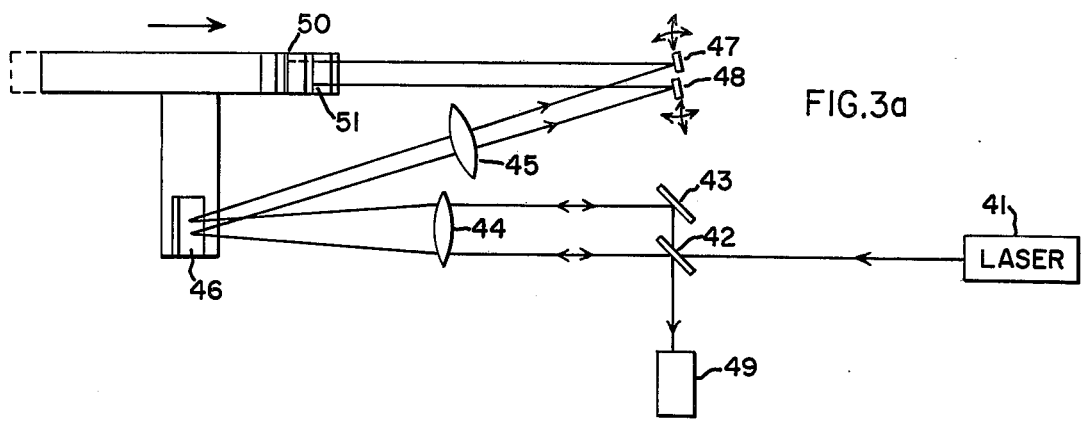
FIGS. 3a and 3b are respectively plan and side elevation views of a second embodiment of the invention incorporating the beam path transformation measures of the first embodiment, and wherein optical comparison is made between two non-specular surfaces.
Figure 3B:
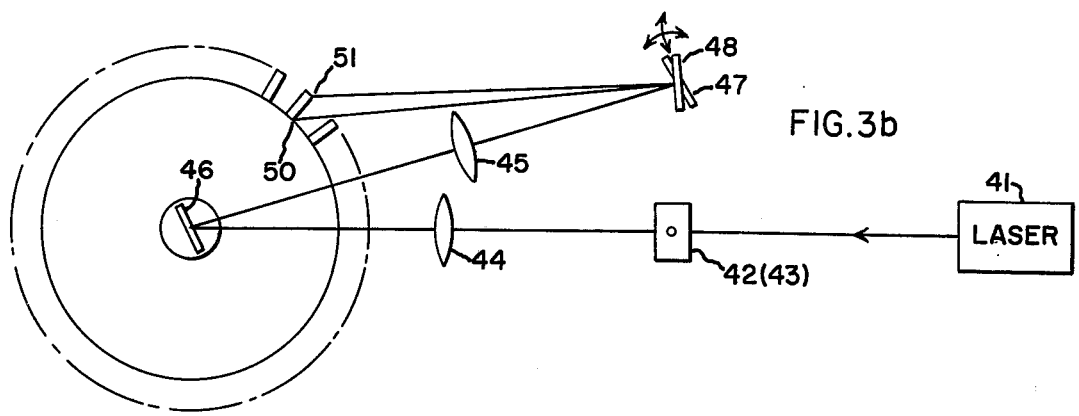

FIG. 3a is a plan view and FIG. 3b is a side elevation of the second embodiment. The comparator's principal components include a laser 41, a beam splitter 42, a mirror 43, first and second lenses 44 and 45, respectively, a mirror 46 mounted for rotation in synchronism with the turbine wheel, a pair of separately adjustable stationary mirrors 47 and 48 arranged adjacent one another for independently directing the analytic and reference beams to the tip and base of the turbine bucket, respectively. The optical detector is shown at 49 and is provided with electrical output means such as those illustrated in more detail in FIG. 1.

The optical paths of both the analytical and reference beams of the second embodiment are transformed in the same manner as that provided for the analytical beam of the first embodiment. The laser 41 directs its output beam to the beam splitter 42 which diverts a portion of the beam which will be used for reference purposes to the mirror 43. The deflected portion then travels through the lens 44, is reflected from the rotating mirror 46, passes through the second lens 45, is reflected by the adjustable mirror 47 to the base of the turbine bucket at the point 50. The reference beam is then reflected from the non-specular base of the blade, back into the optical system, pursuing the prior path in reverse, impinging on mirror 43, now passing undeflected through the beam splitter 42 and impinging upon the detector 49.

The analytical beam of the second embodiment pursues a similar path to that in the first embodiment. As the laser beam impinges on the beam splitter 42, a portion which passes undeflected therethrough becomes the analytical portion of the beam. This portion then passes through the lens 44, impinges on the rotating mirror 46, passes through the lens 45, impinges on the adjustable mirror 48 and impinges on the tip 51 of the turbine bucket. The deflection of the analytic beam follows the same path in reverse, successively passing the elements 48, 45, 46, 44 and finally having a portion deflected by the reverse surface of the beam splitter 42 into the optical detector 49. Thus, both the transformed reference and transformed analytical portions of the laser beam are combined at the detector to permit an optical heterodyne to be formed.

Normally, the Doppler difference of the two points is adequate for the usual IF signal processing system. The use of the Bragg modulator described in the cited patent can be used when the available IF is too low in practice, such as when points of equal ratios are being analyzed for their differential motion.

Figure 4C:
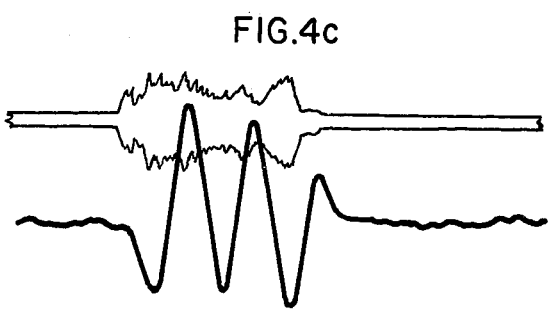
FIG. 4c is a similar reproduction illustrating the performance of the second embodiment of FIGS. 3a and 3b.

The FIG. 4c is an artist's rendering of a photograph of an oscilloscopic reading taken by the second embodiment where both the analytic and reference surfaces are non-specular. While the illustration does not accurately convey the correlation, the observed traces are substantially noisier than when the reference surface is specular. Even so, the signal contains a very substantial signal representing the vibration amplitude as illustrated in the lowermost trace. The measurement is taken at 0.05 thousandths of an inch at a vibration frequency of approximately 3 kilohertz at about 2000 rpm of the 18 inch diameter wheel.

In the foregoing embodiments, the primary loss in coherence is attributable to a change in the angle of incidence of the laser beam on an element of the rotating bucket rather than from slewing of a selected surface element under the laser beam. In general, the first error will be greater than the second error with the scaling herein proposed and when it is desired that the impinging imaged laser beam have a depth of focus of an inch or two in which to take readings. When this depth of focus has been established, then, assuming diffraction limited lenses, the minimum sizes to which the imaged laser beam can be focused are also established. If a focused image is reduced below the two or three thousandths of an inch herein suggested, the effect of the angle of incidence on loss of coherence will be correspondingly reduced as will the depth of focus on the imaged beam. On the other hand, if the depth of focus is to be increased and the spot size enlarged, the importance of precision in the angle of incidence is increased correspondingly. In the present arrangements, the effect of the angular error is between 10 and 100 times as great as the effect of slewing upon coherence.

The two embodiments which have been described contemplate that the angle of impingement of the laser beam be equalized by means of a mirror installed upon the shaft of a rotating object and a lens for adjusting the sweeping rate to equality with the rate of object rotation through an observation window. When it is inconvenient to drive a rotating mirror from the turbine hub, this particular manner of transforming the beam may be modified. One may employ the same laser beam or an additional beam, that is interrupted or modified in some detectable way as each turbine bucket of the wheel passes by. This provides an accurate electrical measure of wheel rotation at the perimeter of the turbine wheel. This pulsed electrical quantity is then used to control a servo motor used to drive said mirror in synchronism with the surface of the turbine wheel. In that alternative, the turbine buckets from which measurement is taken must be evenly spaced about the perimeter of the turbine wheel, so that the pulses produced by each bucket provide an even distribution of pulses indicative of turbine wheel position. Rotational synchronism between the turbine wheel and a motor driven mirror may still be achieved when the driven buckets are non-uniformly distributed about the perimeter of the turbine wheel. When that occurs, the actual bucket positions must be replicated in a dummy rotor driven by the servo motor. One such arrangement is to arrange passing perforations through which light may pass in the perimeter of a rotating drum. In this alternative, the error signal to achieve synchronism with the turbine wheel depends upon sensing disparity in timing between the irregularly timed electrical pulses from the turbine and those which are likewise irregularly timed from the replicative drum.

The previously described modifications and embodiments of the invention provide an increased efficiency in vibration measurement when an object is rotating with respect to the optical comparator. The improvement in efficiency has been adequate so that in many applications, one or both of the surfaces used for measurement may be of a scattering or non-specular nature. The inventive improvements which increase coherence will be useful in increasing the signal to noise ratio of a measurement whether specular surfaces are available or not.

What I claim as new and desire to secure by Letters Patent of the U.S. is:

1. Apparatus for optically measuring a small vibrational motion at the surface of a rotating object, comprising:
   a. a source of a beam of collimated coherent illumination,
   b. means to divide the beam into a reference and an analytic beam,
   c. means to transform the path of said analytic beam in synchronism with said object rotation to cause impingement on said object at a substantially constant angle of incidence throughout a given rotation to increase coherence,
   d. means to intercept the analytic beam after reflection from said surface element, and
   e. an optical detector upon which returning reference and analytic beams impinge, said detector having adequate bandwidth to produce a heterodyne between said beams containing Doppler frequency terms indicative of said vibration.

2. Apparatus as set forth in claim 1 wherein said path transforming means comprises means to cause said analytic beam to rotate substantially in angular synchronism with said object through a given rotation.

3. Apparatus as set forth in claim 2 wherein said path transforming means comprises means to modify said analytic beam rotation in synchronous fashion to cause the locus of intersection of said beam with the surface of said object to coincide with the arcuate path of a predetermined surface element throughout said given rotation.

4. Apparatus as set forth in claim 2 wherein said path transforming means comprises:
   a. a mirror into which said analytic beam is directed, rotating in synchronism with said object to cause beam rotation, and
   b. a first lens for imaging the rotating beam from said mirror upon said rotating object, disposed to adjust the rate of rotation of the imaged beam into substantial equality with the rate of object rotation through said given rotation.

5. Apparatus as set forth in claim 4 wherein:
   a. a second lens is provided for focusing said analytic laser beam on said rotating mirror,
   b. said rotating mirror is disposed in respect to said first lens so that rotation of said mirror causes said analytic laser beam to traverse successive zones of said first lens, and
   c. wherein said first lens has appreciable coma to modify the rotation rate of said imaged beam as successive zones are traversed by said input beam to cause the locus of intersection of said analytic beam with the surface of said object to be arcuate, in substantial coincidence with the arcuate path of a predetermined surface element through said given rotation.

6. Apparatus as set forth in claim 5 wherein:
   a. said first lens and said mirror, without comatic lens error, produce an arcuate locus having a radius of half the radius of said arcuate path, when said analytic beam is tangential to said arcuate path,
   b. the axis of said first lens is arranged in relation to the axis of rotation of said object such that said surface element during said given rotation is at a maximum distance from said lens axis at initial and terminal positions and at a minimum distance at midposition along said angular path; and
   c. wherein said lens provides adequate negative comatic correction to cause substantial equality in the radii of curvature of said analytic locus and said arcuate path.

7. Apparatus as set forth in claim 1 wherein:
   a. said reference beam is directed at a second surface element on said rotating object, and
   b. said path translating means comprises means to cause said reference beam to rotate substantially in angular synchronism with said object through a given rotation.

8. Apparatus as set forth in claim 7 wherein:
   a. said reference beam path translation means comprises means to modify said reference beam rotation in a synchronous fashion to cause the locus of intersection of said reference beam with the surface of said object to coincide with the arcuate path of a predetermined surface element throughout said given rotation.

* * * * *